United States Patent [19]

Ubaldi

[11] Patent Number: 4,779,637
[45] Date of Patent: Oct. 25, 1988

[54] DEVICE FOR THE AERATION OF A FUEL TANK

[75] Inventor: Raymond Ubaldi, Voujeaucourt, France

[73] Assignees: Automobiles Peugeot, Paris; Automobiles Citroen, Neuilly/Seine, both of France

[21] Appl. No.: 76,732

[22] Filed: Jul. 23, 1987

[30] Foreign Application Priority Data

Jul. 23, 1986 [FR] France .................. 86 10705

[51] Int. Cl.⁴ ............................................. F16K 17/36
[52] U.S. Cl. ...................................... 137/43; 137/202; 137/588
[58] Field of Search ............... 137/202, 43, 587, 588

[56] References Cited

U.S. PATENT DOCUMENTS

| | | | |
|---|---|---|---|
| 3,643,690 | 1/1972 | Sarai | 137/587 |
| 3,765,435 | 10/1973 | Schlanzky. | |
| 3,800,978 | 4/1974 | Sigwald | 137/587 X |
| 3,910,302 | 10/1975 | Sudhir | 137/43 |
| 3,970,098 | 7/1976 | Boswank | 137/43 X |
| 3,996,951 | 12/1976 | Parr et al. | |
| 4,095,609 | 6/1978 | Martin. | |
| 4,579,135 | 4/1986 | Sakata et al. | |

Primary Examiner—Alan Cohan
Attorney, Agent, or Firm—Burns, Doane, Swecker & Mathis

[57] ABSTRACT

The device comprises, on one hand, a degassing tube (5) having one end (5a) which opens onto the upper inner part of the tank, markedly lower down than an upper wall (2) of the tank, and, on the other hand, a pipe (8) connecting the inner part to the exterior of the tank through a valve (V) carried by the wall (2), the valve being of the normally open ball (19) and float (10) type, the float (10) extending sufficiently downwardly to be raised by the fuel (7) when the latter reaches said end (5a), the lower end (10B) of the float (10) being lower than the end (5a) of the tube (5), and means are provided to ensure that this raising closes the valve (V) in a partly opened state. This device ensures simultaneously a permanent communication of the inside of the tank (1) with the atmosphere, a guarantee of an integrated expansion volume in the tank, and the prevention of flow of fuel in the event of an overturning of the vehicle.

5 Claims, 1 Drawing Sheet

DEVICE FOR THE AERATION OF A FUEL TANK

The present invention relates to a device for aerating a fuel tank of a motor vehicle, comprising, for putting the upper inner part of the tank in communication with the free air:

on one hand, a degassing tube, one end of which opens onto said inner part lower down than the upper partition wall of the tank, so that an expansion volume, termed integrated volume, is defined when filling the tank to the maximum extent, between said partition wall and the fuel level reaching said end;

and, on the other hand, an aeration pipe opening onto said inner part through a valve carried by the upper partition wall and capable of closing the pipe, at least if the vehicle overturns, and opening the pipe under certain conditions of utilization.

The expansion volume enables the liquid fuel contained in the tank to expand with no risk of overflowing. The valve is opened at least when an aspiration of fuel to the engine of the vehicle implies an entry of air into the tank, or when a heating of the fuel causes its expansion, requiring a discharge of air to avoid an overpressure.

In a known arrangement, the valve comprises two spring-pressed valve members mounted in head-to-toe relation, one of which only opens for ensuring the entry of air when a depression exceeding a given threshold prevails in the tank, whereas the other valve member only opens, for discharging air, when a pressure higher than a given threshold prevails in the tank. The communication with the free or surrounding air is therefore not permanent but depends on the rating of the springs. The valve therefore is hardly reliable.

A float-and-ball valve is known (U.S. Pat. No. 3,565,435) which is normally opened by the effect of gravity and closed either in the case of the overturning of the vehicle owing to the weight of the ball, or when the fuel reaches the height of the valve and raises the float. If such a valve were placed in the conventional manner in the upper partition wall of the tank and associated with a degassing tube opening out at a level lower than this partition wall, upon filling the tank, the fuel would first of all reach the end of the tube and the still-open valve would allow the discharge of the air located higher than this end, the level of the fuel would rise up to the valve, and therefore substantially up to the upper partition wall containing it. There would therefore be no expansion volume formed between the upper partition wall and the end of the tube; if however one would be formed between the float and said partition wall, it would be relatively small and therefore but little compressible and liable to undergo a high increase in pressure in the event of expansion of the fuel, it being impossible to reduce this overpressure by discharge through the valve which is closed so long as the level of the fuel reaches it.

An object of the invention is therefore to achieve the aeration of a fuel tank which preferably has an integrated expansion volume, so as to avoid any overpressure or depression in the tank, while preventing the emptying of the tank in the event of the overturning of the vehicle.

According to the invention, the valve being of the normally opened ball-and float-type, the float extends sufficiently low down to be raised by the fuel when the latter reaches the end of the degassing tube, the lower side of the float being lower than the end of the tube, and means are provided to ensure that this raising places the valve in a partly-opened state.

According to other advantageous features of the invention:

The valve comprises an open housing in which the float slides, the latter defines with the upper end of the housing through which said pipe opens onto the exterior, a chamber permanently communicating with the inner part of the tank through an aperture of small section provided in the wall of the float, and, when the float is in the lower position, through at least one passage left between the housing and the float and capable of being closed in the raised position of the float.

The chamber contains a bell-shaped member which covers a ball bearing in a conical cavity of the float and is provided on its upper side with a boss capable of closing, if the vehicle overturns, an orifice through which the pipe communicates with the interior of the housing.

The valve is fixed to a lower and central portion of the upper partition wall.

Further features and advantages of the invention will be apparent from the following description which is given with reference to the accompanying drawing, which illustrates an embodiment of the invention by way of a non-limiting example:

Figure 1:
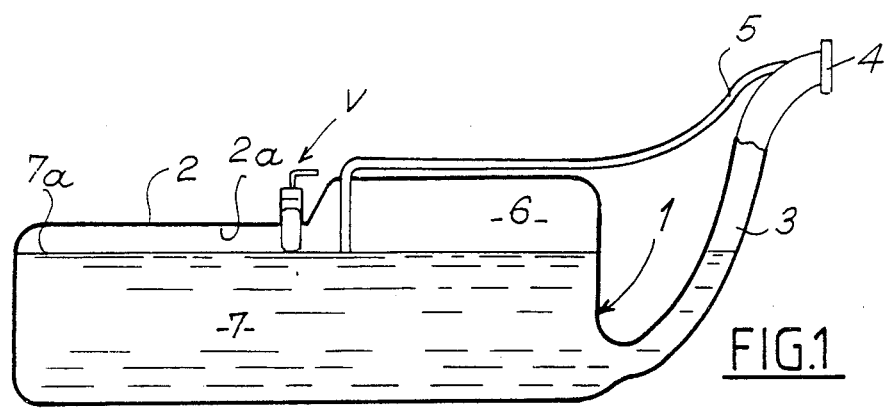
FIG. 1 is a simplified elevational view of a vehicle fuel tank provided with an aeration device according to the invention.

FIG. 1 shows a motor vehicle fuel tank 1 comprising an upper partition wall 2 and a filling tube 3 closed by a sealed cap 4. The tank 1 is provided with a degassing pipe 5 which extends into an expansion volume 6 integrated in the volume of the fuel 7 in the upper inner part of the tank 1, the lower end 5a of the pipe 5 being located at the maximum level 7a of the fuel when the tank 1 is filled. The integrated expansion volume 6 is thus defined by the maximum level 7a of the fuel 7 and by the upper partition wall 2. The end 5a of the pipe 5 therefore opens onto the upper inner part of the tank distinctly lower down than the upper partition wall 2.

The device for the aeration of the tank 1 also comprises a pipe 8 connecting this upper inner part of the tank 1 to the exterior through a valve V carried by the upper partition wall 2.

The valve V comprises a housing 11 which is open toward the interior of the tank 1 and integral with the pipe 8, its base being fixed in a corresponding opening 12 of the upper wall 2. Moreover, it should be noted that the valve V and the end 5a of the degassing pipe are placed as close as possible to the centre of the upper part of the tank, so that the integrated expansion volume 6 is but little affected by the inclination of the vehicle, the valve 6 being fixed to a lower and central portion 2a of the upper wall 2.

Figure 2:
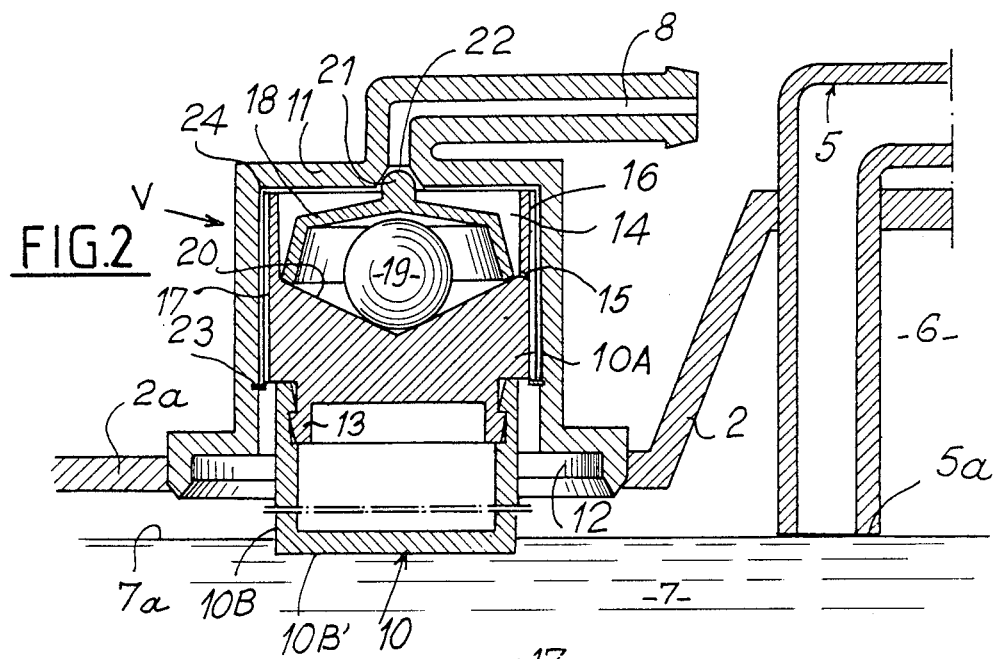
FIG. 2 is a vertical sectional view, to an enlarged scale, of the aeration device of the tank of FIG. 1, and, FIG. 3 is a cross-sectional view of the float at the level of its small-sectioned aeration aperture.
Figure 3:
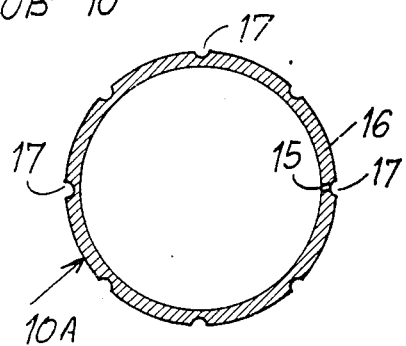

In the presently-described embodiment, the float 10 comprises two parts: an upper part 10A sliding in the housing 11 and a lower part 10B which has a reserve of air and is removably mounted on the base of the upper part 10A, for example, as shown in FIG. 2, by a clipping to a flange 13 constituting the base of the upper part 10A. The latter defines with the upper end of the housing 11, where the pipe 8 opens onto the interior of the housing, a chamber 14 permanently communicating with the inner part of the tank 1 through an aperture 15 of small section provided in the wall 16 of the upper part 10A of the float 10. In addition, at least one passage is provided between the housing 11 the upper part 10a of the float 10: in the presently-described embodiment, a series of eight passages are thus formed by grooves 17 provided longitudinally in the periphery of the upper part 10A. These grooves 17 are closed in the raised position of the float 10 (FIG. 2), when its upper part 10A abuts against the upper end of the housing 11, and are opened when the float 10 is in the lower position, the grooves 17 communicating then with the chamber 14.

The latter contains a member 18 in the shape of a bell which covers a ball 19 bearing on a conical cavity 20 in the upper part 10A of the float 10 and which is provided on its upper side with a boss 21 capable of closing, if the vehicle overturns, an orifice 22 through which the pipe 8 opens onto the inner end of the housing 11.

The sliding travel of the upper part 10A in the housing 11 is limited by a ring 23 which is partly disposed in the inner wall of the housing 11 and constitutes a movement limiter for the float 10. The lower part 10B of the latter extends sufficiently downwardly to enable the float 10 to be raised by the fuel 7 when the latter reaches the lower end 5a of the degassing pipe 5, the lower face 10B' of the lower part 10B being for this purpose positioned below the end 5a.

Further, constructing the float 10 in two separable parts 10A and 10B is preferred, since it permits the us of either the upper part 10A alone for tanks without an expansion volume, or the two parts for tanks having an expansion volume. The lower part 10B is then of a size adapted to that of the volume 6. When the level of the fuel 7 reaches the lower end 5a of the degassing pipe 5, as shown in FIGS. 1 and 2, the upper part 10A of the raised float 10 comes into contact with the upper end of the housing 11 on an annular region 24. The passages 17 are then obturated and the communication between the chamber 14 and the inner part of the tank 1 is limited to the escape aperture 15 whose diameter may be, for example, 0.4 mm.

The aeration device described hereinbefore operates in the following manner:

At the end of the filling of the tank 1, the upper level 7a of the fuel 7 urges the float 10 upwardly into abutment against the upper end of the housing 11 on the annular region 24, by which is therefore ensured a seal between the float 10 and the housing 11, which considerably reduces the air flow. This limitation, jointly with the obturation of the degassing pipe 5 by the fuel 7, renders the "drop-by-drop" filling impossible within a reasonable period of time.

At this stage, the communication with the free air is ensured by the escape aperture 15, which permits:

1. The guarantee, if the tank 1 is full, of the discharge of the gases (urged back) in the case of an expansion of the volume of the fuel when it is heated principally in the summer time.

2. The compensation, when supplying fuel to the engine, of the lowering of the fuel by the air (aspiration) until the float 10 descends, which liberates the annular passage in the region of the region 24. In the event of an overturning of the fuel tank 1, an official regulation limiting the flow of fuel allowed up to 30 grams per minute, is then conformed to, since the ball 19, in moving, shifts the bell-shaped member 18 whose boss 21 closes the orifice 22 of the pipe 8.

The aeration device according to the invention has substantially the following advantages, which permit:

(a) a permanent communication with the atmosphere of the fuel tank;

(b) a guarantee of the integrated expansion volume 6 in the fuel tank;

(c) the conformity with the official regulation concerning the flow of fuel in the event of an overturning of the vehicle.

Indeed, prior known aeration devices do not guarantee simultaneously the three aforementioned functions, or have certain weaknesses, and in particular a lack reliability.

What is claimed is:

1. A device for the aeration of a fuel tank having an upper wall, said device comprising a valve carried by the upper wall, a degassing tube having an end opening onto an upper inner part of the tank at a position markedly lower than the upper wall of the tank, a pipe for putting said inner part in communication with the exterior of the tank through the valve carried by the upper wall, the valve being of the ball-and-float type which is normally open, the float extending sufficiently downwardly to be raised by the fuel when the fuel reaches said end of the degassing tube, the float having a lower end lower than the end of the degassing tube and having a fully raised position that effects closure of the valve, and means being provided to ensure that said valve has a partly opened state when said valve is in said fully raised position.

2. A device according to claim 1, wherein the valve comprises an open housing which has an upper end and in which the float is slidable, the float having a wall defining an aperture of small section and defining at least one passage between the float and the housing and defining with the upper end of the housing, onto which said pipe opens, a chamber permanently communicating with the inner part of the tank through said aperture of small section, and, when the float is in a lower position, through said at least one passage between the housing and the float, which passage is capable of being closed in the raised position of the float.

3. A device according to claim 2, comprising an orifice in an end of the housing, a member in the shape of a bell, located in said chamber and having a boss in an upper side of the bell-shaped member, a conical cavity in the float and a ball bearing in said conical cavity, said boss being capable of closing, in the event that the vehicle overturns, said orifice through which orifice the pipe opens onto the end of the housing.

4. A device according to claim 1, wherein the upper wall of the tank has a lower and central portion in which said valve is fixed.

5. A device according to claim 1, wherein the float is composed of two parts: an upper part slidably mounted in the housing and having a base, and a lower part with an air reserve detachably mounted on said base of the upper part.

* * * * *